United States Patent

Dohanich et al.

[11] Patent Number: 5,819,249
[45] Date of Patent: *Oct. 6, 1998

[54] TAX CODING EXPERT SYSTEM

[75] Inventors: Laurel Anne Dohanich; Stephen Leo Dohanich, both of North Potomac, Md.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 564,553

[22] Filed: Nov. 29, 1995

[51] Int. Cl.$^6$ .................................................. G06F 17/00
[52] U.S. Cl. ............................... 706/46; 706/50; 706/59; 706/60
[58] Field of Search ................................. 395/51, 54, 75; 706/46, 50, 59, 60, 45

[56] References Cited

U.S. PATENT DOCUMENTS

| | | | |
|---|---|---|---|
| 5,006,998 | 4/1991 | Yasunobu et al. | 395/77 |
| 5,574,828 | 11/1996 | Hayward et al. | 395/50 |
| 5,619,991 | 4/1997 | Sloane | 600/300 |
| 5,630,125 | 5/1997 | Zellweger | 707/103 |
| 5,673,369 | 9/1997 | Kim | 395/75 |

*Primary Examiner*—Allen R. MacDonald
*Assistant Examiner*—Jason W. Rhodes
*Attorney, Agent, or Firm*—Whitham, Curtis & Whitham; Arthur J. Samdovitz

[57] ABSTRACT

An analysis protocol embodied in an expert system is articulated into portions to provide optimization of ease of use consistent with ease of design and updating of expert information contained therein. These portions include presentation of a fixed, invariant inquiry sequence and storage matrices which are accessed on the basis of responses to the inquiry sequence, a portion in which a decision tree is traversed efficiently under control of an inference engine based on user selections, preferably from a menu or a hierarchy of menus and a portion in which the analysis sequence is carried out by parsing text from an expert database into queries which are also preferably in the form of menus. Capture of the decision trees traversed together with corresponding user input data for at least selected analyses performed by the Expert system provides for capture of additional rules and business practices and facilitates correction of determinations, consistency of user intervention and expansion of the expert system.

6 Claims, 4 Drawing Sheets

```
ENTER PLACE OF
    DELIVERY  VA
AND PURPOSE OF ACQUISITION

☆   R+D
 ___  MANUFACTURING
 ___  RESALE
 ___  OTHER
```

FIG.3A

```
CHECK ALL THAT APPLY

☆    PURCHASED
 ___   RENTED
 ___   MAINTENANCE/REPAIR
 ___   SERVICES/LICENSES
                     HELP
```

FIG.3B

```
PURCHASED ITEMS—
    CHECK BEST DESCRIPTION
  ☆    PUBLICATION
 ___   FOOD RELATED
 ___   OFFICE SUPPLIES
 ___   FUEL
        ⋮
                     HELP
```

FIG.4

PUBLICATIONS (CHECK ONE)

☆ BOOK
___ PERIODICAL
___ NEWSPAPER
___ MAGAZINE

HELP

FIG.5

HOW IS THIS BOOK
   DISTRIBUTED (CHECK ONE)
___ IN HOUSE
☆ SOLD
___ RENTAL
___ LOAN
___ DONATION

HELP

FIG.6

SOLD TO NON-PROFIT
   SCHOOL?
___ YES
___ NO

FIG.7

TAX CODING EXPERT SYSTEM

BACKGROUND OF THE INVENTION

1. Field of the Invention

The present invention generally relates to computer implemented expert systems and, more particularly, to adaptations of expert systems to particularly complex and alternative decision sequences or trees.

2. Description of the Prior Art

Digital data processors are now familiar and have been applied to numerous fields of endeavor, particularly for facilitating access to databases and the automation of repetitious and time consuming tasks. For example, the facility for editing an electronic file while at least a portion of the file can be viewed by an operator, as provided by familiar word processing programs avoids the necessity of retyping pages when a change is made. Further, modern word processors and special purpose programs can be used to provide forms or to page through a plurality of forms (e.g. for an arbitrary order of data entry thereon) in the creation of a document including completed forms. Certain fields of a form can even be filled in automatically by automated data retrieval or computation.

Data processing systems can also facilitate access to potentially vast databases containing information which may be necessary or helpful to the preparation of a document. Such access is generally not provided by a word processor or other application program unless the application is specific to database access. For example, it is known to include a simple dedicated word processor in a database application. Even then, database access applications are often restricted to a single database due to specifics of data compaction for storage in and access from the database. Since these facilities are usually provided in different applications, until recent years it was generally necessary to exit one application (e.g. a word processor) and start another application in order to access database information and then exit the database access application and restart the original application in order to record the information retrieved. Such a process is, of course, both distracting and time-consuming. More recently, however, multi-tasking has become available in data processors of even modest capacity and computing power. Using multi-tasking, switching between applications and even importing data from one application directly into another is now quite routine.

So-called expert systems have also become known in recent years although use has not been particularly widespread. Expert systems attempt to impart the knowledge of an expert in a particular and limited field by organizing an analysis protocol or sequence into a decision tree or similar analysis structure. At each of a sequence of nodes of the decision tree, an inference engine in which the decision tree is implemented, generally in software, issues a prompt to the user in the form of a question, generally coded uniquely to the node, requesting information (often merely yes or no or a selection between key words) which will be determinative of a branching operation which leads to the next node of the decision tree. The order of questions follows the analysis protocol and is effectively built into the inference engine. The answers input by the user are stored or "matrixed" for use in formulating a response when the analysis protocol permits a definitive response (for example, as a leaf node is reached), as could theoretically occur at any node of the decision tree. If plural responses are possible, the inference engine, if so designed, may provide a so-called confidence level or confidence factor for each of the possible responses reported to the user and/or identify inconsistencies between possible responses and input data.

The concept of an inference engine implies a simulation of reasoning based on facts. The simulation of reasoning is developed from capturing of facts in an orderly fashion ideally based on the collective reasoning of a plurality of persons having a high level of expertise in regard to a particular subject. This collective expertise, including interpretive reasoning based on knowledge of the subject matter, establishes an order of what data or facts may be most important to the reaching of a determinative result at an early stage of an instance of an analysis and thus develops the capability to "infer" a productive line of inquiry for capture of the "facts". While interpretations and inferences will vary from expert to expert, an expert system allows for the accumulation of expertise from a plurality of experts for application to an analysis, such as by the development and comparative evaluation of confidence factors. Capture of such expertise can be accomplished during the development (e.g. knowledge capture time frame) of the expert system or during updates of expert system in which alterations of the decision tree may be made based on changes in expert knowledge from time to time, such as may be occasioned by changes in laws which must be interpreted and applied.

When a determination is thus made, even if not unique, data (e.g. documentation of the analysis method or authority for the determination, consequences of the determination and the like) can be retrieved and stored with information regarding the instance of the analysis and the information input by the user. Thus, the inference engine theoretically allows rapid and efficient step-by-step traversal of a decision tree as information pertinent to a decision is obtained from the user.

It should be understood that decision trees need not be logically "flat" and portions of the analysis protocol may be common to a plurality of branches. Branching to a portion of an analysis protocol which is common to a plurality of trees or branches of a tree can be done at any point in the analysis with return to the original tree or branching to variations of the analysis protocol performed on the basis of previously collected information under control of the inference engine. Branching may also be done based on comparison of confidence factors at any stage of the analysis with return to the branching point if a particular portion of the analysis chosen by a branching operation is found to be unproductive or not fully deterministic. Further, a plurality of decision trees may be included in an expert system although it is the general practice to join a plurality of trees at the "root" with a threshold question which determines the choice of decision tree which will be traversed.

In this way, expert systems may provide, in effect, access to a relatively large body of information. The access procedure which is embodied in the analysis protocol is generally highly efficient since only information pertinent to a decision or response will be requested from the user and the reasoning embodied in the analysis protocol (which, in turn, ideally embodies the combined expert knowledge and reasoning of a plurality of human experts) will effectively be transparent to the user but usable as if the user possessed such expertise. Further, the user is effectively protected from errors of judgement in the decision since only pertinent information is requested or accepted by the expert system and analysis and interpretation are consistently applied.

An expert system, while initially difficult to construct and which implies that a definitive analysis protocol exists, at least in the great majority of instances requiring analysis, nevertheless also allows subsequent changes with potentially far-reaching implications to be readily implemented; often simply by the addition or deletion of a branching statement or the alteration of the argument or branching address of such a branching statement. This facility is in sharp contrast to other types of applications (such as commercially available income tax preparation applications which are hard coded to obtain all information and do not utilize inference or analysis protocols. In these latter types of applications, extensive alterations of software are required to implement even minor changes.

The initial difficulty of development of an expert system is the development of an analysis protocol which is unconditionally deterministic for virtually all instances. The development of a deterministic protocol has thus limited the application of expert systems in financial matters since a decision is often reached only by subjective choices based on a plurality of potentially inconsistent analyses or because of the complexity of the expert system which would be required. That is, for particularly complex analyses or where numerous subtle distinctions may be required, even if only infrequently encountered, an expert system directed thereto may simply not be economically feasible.

The concept of truncation of an expert system to avoid coding of minutiae or inconsistent analysis paths in the software is entirely contrary to the expectation that the expert system will be able to unconditionally reach a determination in virtually all instances. Further, any truncation of the analysis protocol, being inherently arbitrary, would potentially waste time (e.g. for data entry which does not result in a specific determination by the expert system) and would undermine confidence of the user in the expert system since erroneous determinations could be made if all conditional exceptions to each determination are not exhaustively included even when the expert system is so configured that truncation of the analysis results in the return of confidence factors for each alternative possibility. Further, if the analysis provided by the expert system should yield a result which is outside the scope of the system expertise or not deterministic, the system should indicate that result. A result of this nature requires human expert intervention to complete the analysis and an update of the system if another instance of similar data can be anticipated.

Further, exhaustive software may reduce execution speed below expected or acceptable rates (for example, branch prediction and prefetch techniques may not yield gains in execution speed) and savings in software coding provided by inference and branching to avoid sub-routine duplication may complicate the implementation of changes at a later date. Similarly, expert systems may be of limited value where a lengthy analysis must be performed for each transaction or instance. Additionally, evaluation of conditional exceptions to a determination has generally required individual processing of each such conditional exception; often greatly increasing the required amount or even duplication of user input as well as processing time required for analysis.

Conversely, expert systems are more suited to fields of endeavor where a determination and response can be made, in the great majority of instances, with a very few questions from the expert system and lengthy analyses, while provided in the expert system, occur comparatively rarely. Unfortunately, except where branching can be used to shorten lengthy analyses and conditional exceptions to determinations relatively limited in number, application of expert systems and updating thereof has not been feasible.

Nevertheless, there are numerous fields of endeavor in which analyses are, at least in theory, necessarily deterministic, require knowledge of a large body of information which may require potentially frequent updating and in which lengthy and complex analyses may occur relatively rarely (e.g. 1% to 10% of all analysis instances). Thus, such fields of endeavor may be good candidates for implementation of an expert system but for the number of conditional exceptions and complexity of some analyses which must be accommodated. For example, an accounting system which categorizes items in accordance with tax consequences, computes those consequences and stores an indication of the section of the tax code relied upon or other information which may be needed in reports derived from the system would be a good candidate for application of an expert system but for the number and complexity of tax codes which must be embodied therein (e.g. the federal tax code and those of numerous states and pertinent foreign countries), the complexity thereof and the numerous circumstances under any or all of those codes which may require special treatment and thus constitute conditional exceptions to expert system determinations. Further, as the body of expertise or the number of sources of information therein, as embodied in the expert system, becomes large, even the relative ease of changing or updating the expert system may become so cumbersome and complex as to be prohibitively costly or engendering of errors or the like.

Accordingly, it is seen that the field of endeavor or the function to be accomplished by an expert system may, itself, limit the applicability of an expert system thereto even though the potential utility and benefits are potentially very great. There has been no technique available in the art which overcomes the complexity of making changes to complex analyses and conditional exceptions while facilitating processing of conditional exceptions as well as changes thereto.

SUMMARY OF THE INVENTION

It is therefore an object of the present invention to provide a technique for increasing the applicability of expert systems to particularly complex and comprehensive bodies of expert information which may be embodied therein and which may include numerous exceptions to a large number of possible determinations.

It is another object of the invention to provide an expert system to provide an application of an inference engine to bodies of expert information which are large and/or derive from multiple sources.

It is a further object of the invention to provide an application of an expert system which can be more readily constructed and updated than previously known expert system applications, even when the body of expert information implemented is extremely large and complex.

It is yet another and particular object of the invention to provide an application of an inference engine to an accounting system capable of tax coding.

In order to accomplish these and other objects of the invention, an expert system including a database, an expert knowledge interface and an inference engine is provided wherein the inference engine includes an inquiry sequence comprising a sequence of invariant inquiries, and at least one pointer to a location in storage, the expert knowledge interface includes at least one data storage matrix which is accessible on the basis of responses to the inquiry sequence, and wherein the pointer is accessed in response to return of data of a first type accessed from said data storage matrix.

By dividing the analysis into a section based on an invariant but expandable inquiry sequence and processing of one or more exception sequences or user intervention only as necessary while collecting user input data responses until completion of the analysis, the architecture of the expert system is simplified and the operation thereof improved.

BRIEF DESCRIPTION OF THE DRAWINGS

The foregoing and other objects, aspects and advantages will be better understood from the following detailed description of a preferred embodiment of the invention with reference to the drawings, in which:

FIGS. 3A, 3B, 4, 5, 6 and 7 are representations of exemplary screens employed in a preferred embodiment of the invention by which the operation of an exemplary embodiment of the invention may be readily understood.

DETAILED DESCRIPTION OF A PREFERRED EMBODIMENT OF THE INVENTION

Figure 1:
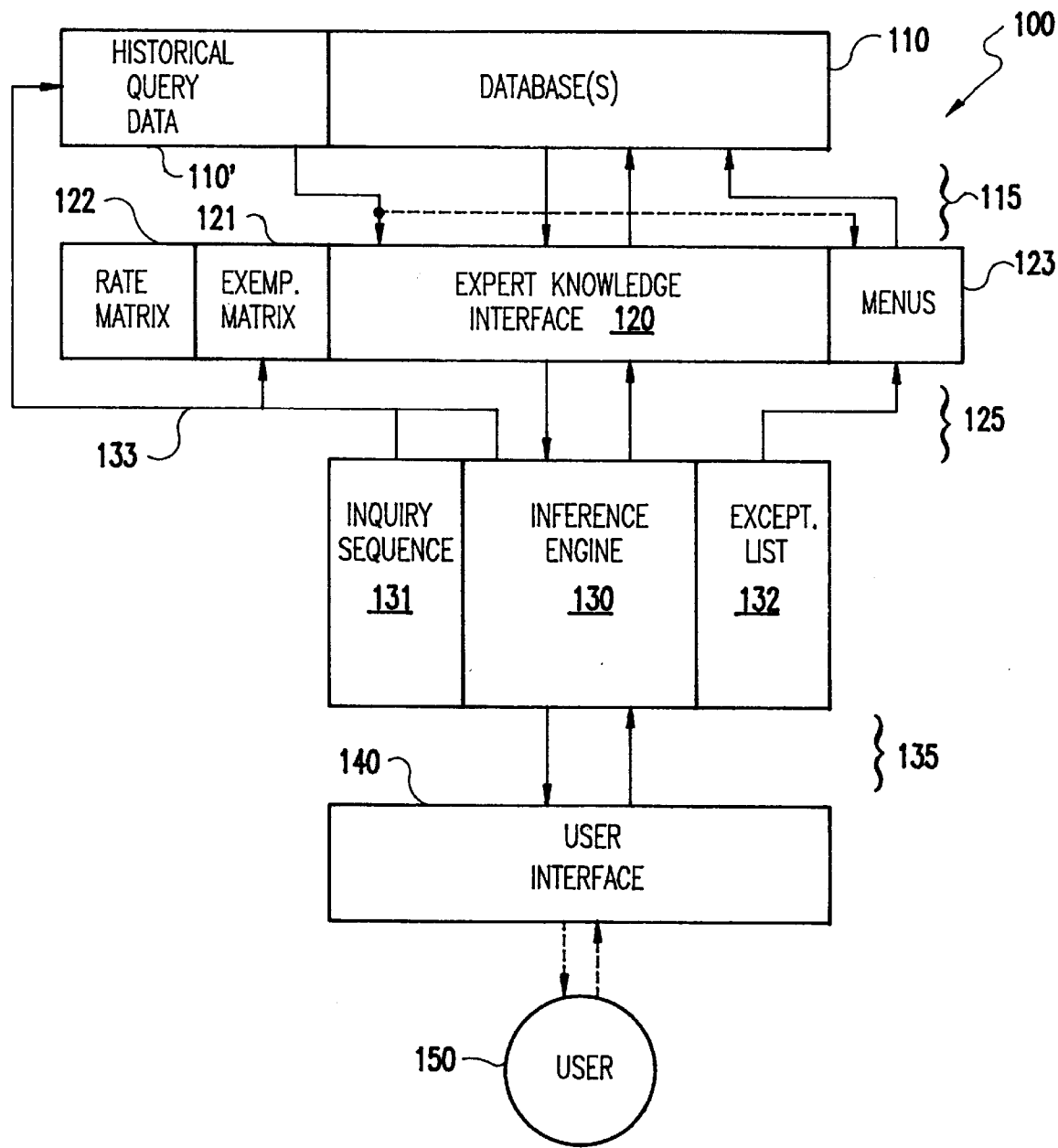
FIG. 1 is a high-level schematic diagram of the system of the present invention.

Referring now to the drawings, and more particularly to FIG. 1, there is shown, in high-level schematic form, a preferred architecture of an expert system implementing the invention. It should be appreciated that this high-level architecture is not specific to any particular application of an expert system. While the invention will be explained below in accordance with an application to an accounting system for tax coding, particularly as to sales or use taxes, such application should be regarded as exemplary of a particularly large and complex body of expert information which the present invention can accommodate but which could not, as a practical matter, be accommodated in prior expert systems. By the same token, the following description of application of the invention to tax coding should not be considered as being in any way limiting as to potential applicability of the invention.

In order to understand the complexity of a body of expert information to which the invention may be applied, it should be understood that, for example, sales tax and use tax laws in the United States are extremely complex and this complexity is increased by the variation of such laws among numerous jurisdictional levels (e.g. city, county, state, etc.) at which they may be applied. Applicability may also be affected by point of delivery or required shipping (e.g. interstate shipment or shipment to or from a foreign country) and the use to which goods are to be put. On the other hand, the existence of tax consequences attendant upon a purchase of goods and a determination of what the tax consequences may be (e.g. the applicable tax rate and the jurisdiction to which the tax must be paid) are often determinable on the basis of a relatively few pieces of information unless a conditional exception to the determination is applicable.

For example, many purchases are non-taxable but rules vary from jurisdiction to jurisdiction and are not always clear-cut; potentially requiring a complex analysis and decision process to determine tax consequences under applicable rules and statutes. Additionally, companies can apply for tax exemptions in states in which it plans to do business when the company purchases goods for resale or for use in production or research and development, although some states further limit such exemptions or do not issue exemptions at all. When such exemptions are granted, a company will have a different exemption clause for each state which grants an exemption and the exemption clause (e.g. NY-72282XX), of which there may be more than one for any particular state or jurisdiction must be attached to the purchase.

If a purchase is not tax-exempt, the jurisdiction to which tax must be paid and the amount of the tax must be determined on a jurisdictional basis since tax rates may vary locally. For example, a purchase delivered to upstate New York may be taxable at a rate of 7% while a purchase delivered to New York City may be subject to a tax rate of 8½%. Also, if not tax-exempt based on jurisdiction and use, tax exempt status may be conferred by other factors. For example, a subscription to a periodical may be tax exempt in some jurisdictions when a subscription to another periodical is not due to publication at greater or lesser frequency than another periodical. Similarly, fuel oils may be generally taxable in some jurisdictions unless delivered by pipeline.

Returning to FIG. 1, the architecture of the expert system 100 includes a database 110, preferably including storage of historical query data 110', which is accessed over a bi-directional communication link 115 through an expert knowledge interface 120 from an inference engine 130 which communicates with the expert knowledge interface 120 over bidirectional communication link 125. The expert knowledge interface 120 is preferably arranged to function as a cache (i.e. for rapid access and to avoid excess numbers of operations in main memory, particularly in a network environment) including at least a "matrix" 121 (so-called for convenience and to imply data accessible in accordance with a plurality of conditions or categories of address criteria, although actual articulation of the data storage and its location within a particular data processor or system is unimportant to the practice of the invention) of storage addresses for storing indications of states or jurisdictions granting exemptions and which have been obtained, the reasons for the exemption and the applicable exemption clause. The expert knowledge interface also preferably includes a further storage "matrix" 122 of states and the tax rates applicable therein. This further matrix would include breakdowns for jurisdiction within the state where different tax rates may apply, any difference in tax rates within a jurisdiction (e.g. for particular uses or categories of goods or differences as to methods of delivery), and the like and must be updated as tax rates or rules of applicability are changed in each jurisdiction.

The inference engine 130 directly drives the user interface 140 and receives user responses as inputs therefrom over bi-directional communication link 135. The user interface is preferably a keyboard and screen of a well-known type connected to the processor or a terminal of a system in which database 110, expert knowledge interface 120 and the inference engine 130 are resident. However, if of convenience in particular circumstances, any or all of these elements could be remotely located such as on another, independent processor or system with which the user interface 140 and connected processor could communicate, for example, by modem over telephone lines or the like, which is also schematically depicted at 135. Further, the user interface 140 can utilize other media of communication with user 150, such as voice synthesizer and voice responsive inputs within the scope of the invention. Likewise, the "user" 150 could, in fact, be partially or wholly automated such as by another processor or peripheral device such as a storage media, optical character reader or the like, which can respond to inquiries. Therefore, the inquiries provided to the "user" 150 by the user interface 140 need not be in any particular form or even in human-readable form. In summary, the particular articulation of the invention across any particular data processing system and the actual hardware on which the invention is implemented is not critical to the practice of the invention so long as the architecture illustrated in FIG. 1 and described herein is generally observed in hardware and/or software.

As alluded to above, the inference engine 130 includes an inquiry sequence 131 which embodies the analysis protocol of the expert system. In accordance with a significant feature of the present invention, particularly in the preferred exemplary application to tax coding, this sequence is preferably limited to an invariant, but, nevertheless, expandable series of questions which will be dispositive of an arbitrarily high percentage of analysis instances (e.g. an individual purchase, delivery or other transaction requiring analysis). In the case of tax coding for sales or use tax on purchases, input of the jurisdiction of delivery and the use of the goods or services purchased will be determinative of over ninety percent of instances. Such an arbitrarily high percentage could, of course, be diminished by changes in the tax code but it is anticipated that such an arbitrarily high percentage of queries which can be analyzed by a fixed series of questions generally could be restored by the inclusion of one or, at most, a very few other questions in the fixed sequence. The remainder are easily treated as exceptions, such as the mode of delivery and publication frequency cases mentioned above.

It is considered desirable in other applications of the invention, as an incident of the design of the expert system, to choose the length of the inquiry sequence 131 implemented in the inference engine 130 such that any instances which do not allow a determination based on that inquiry sequence to be treated as exceptions and to lengthen the inquiry sequence as needed (e.g. by adding inquiries common to the largest number of "exceptions") until an adequately high percentage of determination can be made directly from inquiry sequence 131. This provision for limitation of the inquiry sequence 131 provides for simplification of the expert system and development thereof as well as reducing processor overhead since relatively few inquiries will be made in the great majority of instances and provision for matrixing of responses can be similarly limited. Operationally, this allows storage requirements for the great majority of instances to be handled in the manner of a cache; increasing execution speed. In essence, the division of the analysis into a shortened inquiry sequence and identified exceptions allows the expert system to be simplified as if the analysis were truncated without incurring the errors and indeterminate instances which would otherwise result from truncation of the analysis.

It should also be noted that no processing penalty results from extension of the inquiry sequence since the inquiry sequence may be terminated as soon as a determination can be made (e.g. when a leaf node is reached in the decision tree); resulting, for example, in a taxable/non-taxable decision and a return of a computed taxable amount or an exemption clause. The difficulty of development of an expert system having a marginally longer inquiry sequence and updating thereof (which, of course, will be minimal for short and relatively basic inquiry sequences) is relatively slight, particularly as compared with known expert systems in which exhaustive provision for virtually all possible combinations of responses and determinations in the inquiry sequence is made.

To provide for analysis of instances which cannot be determined on the basis of inquiry sequence 131, it is preferred to conduct further analysis on the basis of identified exceptions to determinations represented in the inquiry sequence. It is also preferred to provide for these exceptions in a list 132 which is preferably ordered by frequency of exception occurrence, number of inquiries required for the exception to be determinable (e.g. proximity of a leaf node to the root of the decision tree for that exception), commonality of inquiries between analyses required for various exceptions or some other convenient criterion. The ordering of the exception list 132 can also be dynamically varied in an adaptive manner by known artificial intelligence techniques e.g. based on frequency of occurrence together with frequency of successful determination). In any event, the importance of the order of exceptions in exception list 132 is relatively slight since the analysis instances which will require analysis of exceptions will be relatively small.

When a determination is not made on the basis of inquiry sequence 131, the inference engine 130 invokes exception processing by picking an exception from exception list 132. The lack of a determination can be an incident of the methodology of the analysis protocol or, if the methodology leads to an assumed determination with or without an arbitrary confidence factor, the existence of an exception can be indicated within the expert system by a flag in matrix 121 and/or 122. Either or both indications of a lack of a determination can be used within the expert system 100 to cause accessing of the exception list 132. Such a lack of a determination or the invoking of exception processing can also be advantageously used to trigger capture of an inquiry and response sequence for storage in historical query data database 110' which can then be searched for similarities to any later analysis instance, as will be discussed below.

Each entry in the exception list 132 preferably contains a pointer to information in the expert knowledge interface 120 or the database 110 where an identification of data necessary to analysis in accordance with the exception will be stored and, possibly, an identification of that exception which may be used much in the manner of an exemption clause when a determination is made to identify the analysis sequence used if the analysis is successful. The identification of information required for analysis of an exception can be provided in numerous ways, any one of which may be preferable for a particular application of the invention. However, for tax coding, the applicable statutes and rules may be perused by the designer of the expert system and key words extracted and placed into a group of user-selectable information such as a menu or hierarchy of menus. This could be done, for example, with known applications similar to word processors, which also provide for establishment, at the will of the user, how responses are to be combined, such as by the provision of a Boolean expression which corresponds to the statute or rule. Menus are preferably stored in a portion 123 of the expert knowledge interface 120 from which they can be rapidly retrieved. Generally, exception information or menus can be conveniently prefetched from database 110 based on jurisdiction entered in response to inquiry sequence 131. Since the menus comprise relatively short pages or text strings, they can be readily cached with small hardware overhead to allow such rapid access.

Alternatively and/or (as in the preferred embodiment of the invention) additionally to the provision of menus, key words, dates and the like can be flagged in electronically stored text, which is preferably stored in database 110 of the statute or rule and parsed into one or more standardized inquiry texts in the form of questions by any known data merging technique or sub-routine. The provision of text in the statute or rule is desired so that the user may directly consult the same at any desired point of the analysis at the will of the user and the expert system overridden, if desired. The flagging of key words in stored text also provides a further convenience in updating of the analysis and avoids redundant storage in cases which may be encountered only rarely.

Responses to further inquiries, whether the inquiries are in the form of menus, questions or other formats, are stored in the expert knowledge interface 120 (e.g. 123) until cleared when a determination is reached (or it is found that the instance is an anomaly which cannot be successfully analyzed and user intervention will be required for the determination). The order of inquiries and responses (e.g. the hierarchy of menus) within each exception analysis can be arranged, preferably with pointers selected in response to menu selection but the order is of somewhat lesser importance to convenient use of the invention due to the relative infrequency of exception analysis.

If the analysis in accordance with a first exception to the analysis does not result in a determination, the inference engine then proceeds to the next exception in exception list 132. However, the data input in response to the analysis in accordance with earlier processed exceptions preferably remains available (since a determination has not been made) and only additional data pertinent to the exception currently being analyzed and which has not been earlier provided to the expert system will result in an inquiry being presented to the user by user interface 140. In practice, after analysis of a small number of exceptions, further information will seldom be required and the inference engine merely checks, in sequence, the previously input information against the identification of information and decision criteria stored at the addresses specified by the sequence of pointers in the exception list; thus exhaustively applying the expert system to the analysis and calling for further information from the user only on an as-needed basis. Since the response information is cached, only a single database access, at most, will be required for each exception and the analysis can proceed at very high speed, even when the exceptions are numerous. It should be noted in this regard that exceptions can be prefetched from memory if the exception list 132 is ordered, as is preferred for that reason.

However, it should also be understood that, in practice, the exception list will generally be fairly short since the determination has been limited by the responses to the inquiry sequence 131, even if the inquiry sequence is very short. For example, in the preferred tax coding application of the invention, after jurisdiction and use have been input, the length of the exception list seldom exceeds two or three and a determination can often be made on the basis of only a single inquiry and response. On the other hand, while there is no theoretical limit on the length of the exception list or, for that matter, the fixed but expandable inquiry sequence, ordering of the exception list on the basis of commonality of required information provides for the application of inference by the inference engine 130 even among a plurality of potentially highly disparate exceptions.

Figure 2:
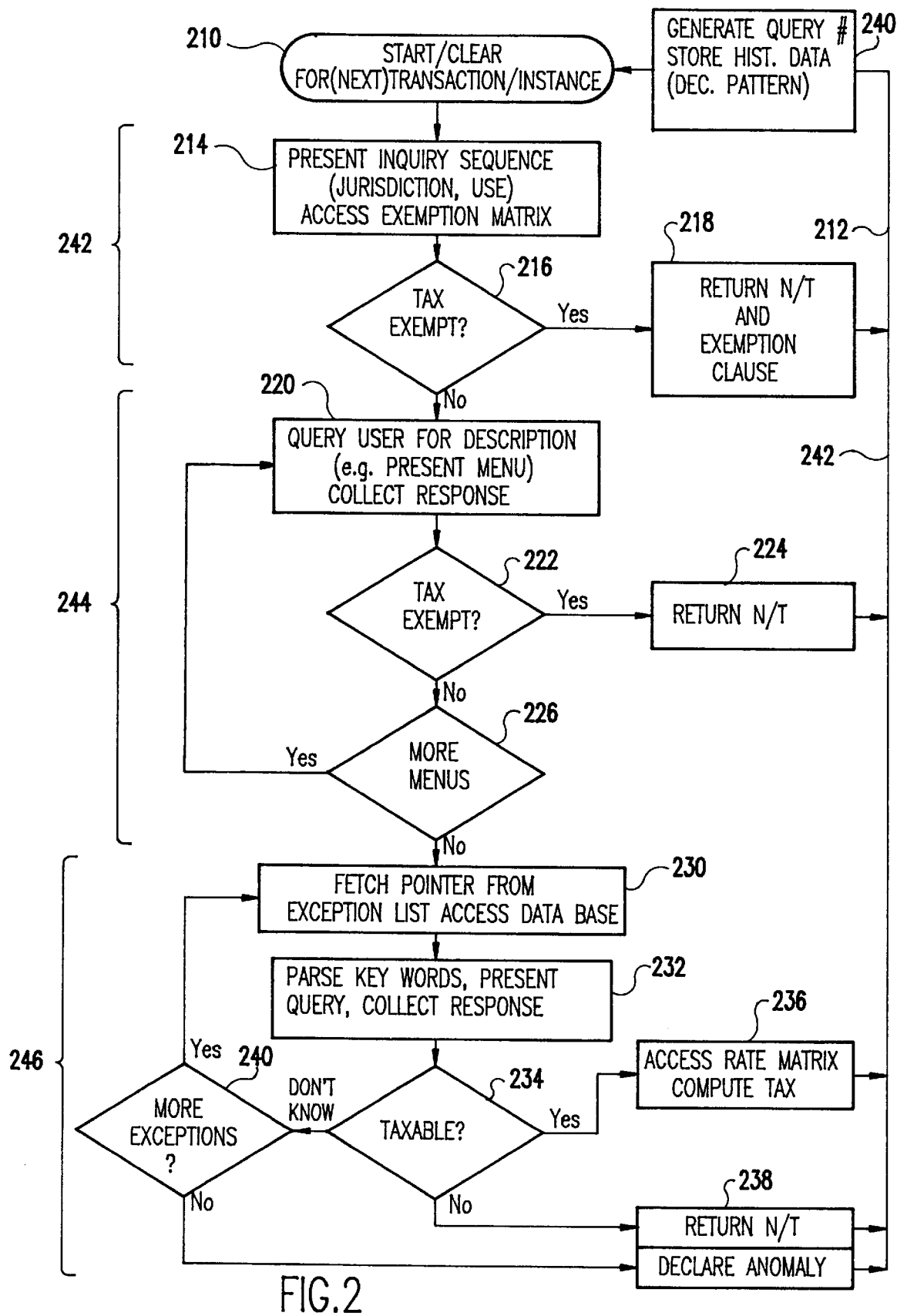
FIG. 2 is a flow chart illustrating operation of the invention.

Referring now to FIG. 2, the operation of the invention will be discussed. The analysis of each instance, transaction or purchase begins at 210. Since it is contemplated that expert systems in general and the present invention, in particular, will be used for numerous analyses in sequence, each determination provides an exit to loop 212 which, unless the process is terminated, will re-initiate the system, clearing prior user responses from memory in the inference engine 130 and starting the process for the next instance requiring analysis. Loop 212 preferably contains an operation 240 which captures each instance when the expert system is used in the course of an analysis or determination. Preferably, for this purpose, a query number is generated and the query sequence and responses are captured directly from the inquiry sequence 131 and inference engine 130, as shown schematically at 133 of FIG. 1.

It is to be understood, however, that if operation 240 is placed in loop 212, as indicated, every analysis decision tree will be captured even if exception processing is not involved to provide an analysis data trail and a tracking number. This is preferred by the inventors at the present time since it provides full documentation for the manner in which every exemption was reached including updates and/or adaptive changes to the expert system and whether user intervention with or without override of the expert system has been employed. However, this operation can be placed at other locations in the loop such as at location 242 to capture only more complicated processing. This latter function may be preferable for reduction of archival data processing or where updates of matrices (e.g. 121, 122) were particularly rare. However, storage requirements may be significantly reduced by periodic downloading of the captured decision trees corresponding to analyses to archival static storage (e.g. tapes or disks) or simply by periodic back-ups of the system.

It should also be appreciated that the storage of at least a number of captured decision trees (e.g. by capturing inquiry and response text and user intervention operations, in sequence, in any form, including coded representations thereof) traversed during respective analysis instances forms a database which can be searched in a conventional manner. The decision tree and user input data from the current analysis can be automatically input for search and comparison or matching of all fields containing data or fields selected by the user (e.g. by disabling of some fields to broaden the search of the database) in order to retrieve prior analyses presenting similar data. Thus the capture of analyses also provides for developing "rules-of-thumb" and current or established business practices which can be presented to the user (e.g. in a tabular fashion on the display) for reference when user intervention is required. Cross-reference pointers can also be generated in such a case. Thus, the invention provides for consistency of use even when operator intervention is required.

Further, cross-reference pointers can be used to trace similar decisions which changes in decision rules may be require to be changed or corrected at a later date, such as for statutes having retroactive effect or when business policies or practices are changed. Likewise the accumulation of analyses and records of user intervention, when correlated, such as by cross-reference pointers, provide for updating and expansion of the decision trees of the expert system to further facilitate use thereof.

Once started, the initial, invariant, inquiry sequence is presented to the user at 214. The presentation can be on a single screen, such as is illustrated in FIG. 3A, if the sequence is short, as in the preferred application of the invention, in which the user is always queried for jurisdiction of delivery of the purchased item and the use to which it will be put. On the basis of the user's responses to this invariant but expandable inquiry sequence, the exemption matrix 131 may be accessed.

If the exemption matrix contains dispositive information, such as an indication that the purchase is tax-exempt, that circumstance will be detected at 216 and the appropriate response made, such as returning information that the purchase is non-taxable and the exemption clause. If the exemption matrix does not return a definitive response or contains an indication that further information is required (e.g. an exception flag), the analysis process continues at 220.

Step 220 is actually the first point at which the inference engine 130 is functionally important. That is, the accessing of information from storage based upon fixed criteria is a rudimentary database function. However, in circumstances where the user may not know or consistently apply information, such as where special definitions of terms are utilized or distinctions made requiring specific expert knowledge, a very large number of considerations may be involved in developing the information on which the determination by the expert system may be based. That is, in terms of the preferred application of the invention to a tax coding system, the questions of jurisdiction and use are common to all analyses and further information usually involves the identity of the goods or services purchased and the terminology used to identify those goods or service is based on specific criteria or considerations which may not be known or consistently applied by a user. Further, each response may indicate that one or more of those considerations is irrelevant to the remainder of the inquiry.

Accordingly, these considerations cannot be efficiently presented to a user in an exhaustive sequential fashion. Accordingly, an inference engine is used to traverse a decision tree to determine operative information. Preferably, this decision tree is embodied in a series of menus; a menu being provided for each node of the decision tree. For example, a printed document might be either a book or a periodical; a periodical, in turn, might be either a newspaper (which is defined as being published at least once per week) or a magazine (which must be published at least quarterly to be so identified). Other considerations such as the location and method of delivery and timing or duration of the purchase may be applicable to either type of periodical or even to books in the case of a book being updated on a periodic basis. These considerations are thus presented to the user as consecutive nodes of a decision tree which can be efficiently traversed by an inference engine 130.

These types of inquiries are preferably presented to a user as a hierarchy of menus which are retrieved from the database 110 through the expert knowledge interface 120 where they are transiently stored. It is also preferred, as a matter of generality of application of the invention in this preferred embodiment and for purposes of updating the database to invoke the presentation of menus as a first exception of the exception list 132 since the need for further information is, in fact, an exception to determinability based on inquiry sequence 131. Further, in this regard, the menu sequence and possible choices in each menu may vary between jurisdictions and the choice of a particular menu or hierarchy of menus may be made on the basis of previously entered jurisdiction information. Alternatively, the exemption matrix may contain a direct pointer to a particular menu or hierarchy of menus (e.g. rather than an exemption flag, for example).

Each possible response in each menu (e.g. "purchased" in FIG. 3B) should contain a determination based on that menu item and previously input information (or an expression by which that information can be evaluated to produce such a determination) or a pointer to the a next menu (e.g. FIG. 4) in the hierarchy and appropriate to that menu selection; thus embodying nodes of a decision tree. Any node can allow a response which will cause branching to a leaf node which does not point to a further menu or otherwise indicate a determination, such as by evaluating previously input data or providing the determination directly. The determination or branching to a leaf node is detected at 222 whereupon a desired return is made at 224. If the node is not a leaf node, it preferably will contain a pointer to another menu (e.g. FIG. 5) in the hierarchy of menus, assuming of course that any further inquiry required can be efficiently presented or updated in that form. The existence of another menu in the hierarchy is determined at 226 and if such a menu is available, the process loops to 220 and is repeated until the available and relevant menus are exhausted.

If the relevant menus are exhausted and the expert system remains unable to make the required determination (e.g. derive a deterministic result from the analysis), the invention causes branching at 226 to 230 whereupon the next exception in the exception list is invoked. As previously described, the exception contains a pointer to a location in database 110 which is accessed through expert knowledge interface 120, in the same manner that a hierarchy of menus 123 was found and retrieved. At the location in database 110 indicated by the pointer provided by the exception, key words are retrieved and parsed into text in one or more standard inquiry formats and presented to the user as shown, for example, in FIG. 6 or FIG. 7, to which the user can respond in a similar manner, as indicated at 232.

It should be recognized that the inquiry illustrated in FIG. 6 is, itself, in the form of a menu; the difference from the menus illustrated in FIGS. 3A–5 being that the menu of FIG. 6 is created, as needed, based on key words. Therefore the screen need not be specifically formulated during the creation of the expert system and thus does not require updating by alteration of menus and the consequences of menu item selection. As indicated above, updating of the expert system at this level may be done simply by the identification of operative words and the consequences thereof (for making a determination or providing additional key word in a similar screen) in a text string corresponding, for example, to the text of a statute.

As each further user response is entered and stored, a determination will be attempted as indicated at 234. If the determination can be made (e.g. that the purchase is taxable), matrix 122 in the expert knowledge interface is accessed (e.g. to determine a tax rate based on previously input jurisdiction information) and desired return made (e.g. the tax is computed and reported, as shown at 236 and/or stored or a N/T, non-taxable return made, as shown at 238). If a determination cannot be made, further potentially operative information is sought by further access to the exception list 132 at 240 and the inquiry, user response and evaluation process repeated by looping to 230. When the exception list is exhausted, it is likely that an erroneous or inconsistent user response has been made and an anomaly is declared as also shown at 238. An anomaly can also be declared prior to exhaustion of the exception list if inconsistent or irreconcilable information is encountered at 234 such that a determination is not likely even with further information.

It should be recognized in view of the foregoing description of the architecture and function of a preferred form and application of the invention that the expert system in accordance with the invention is divided into three sections 242, 244 and 246 which access and apply expert knowledge and interact with a user in slightly different ways. The articulation of the analysis is arbitrary among these three sections and particular inquiries may be readily moved from one section to another by either adding or deleting menu entries in correspondence with removal or addition of inquiries in inquiry sequence 131 or exceptions in exception list 132, respectively. Thus the three sections may be freely allocated over the required analysis protocol to accommodate both ease of user interaction and expert system updating and modification. Further, section 244 can be developed through statistical analyses and system refinements after the expert system is placed in service (or even developed adaptively through artificial intelligence techniques) as an incident of the basic architecture of the expert system described above with reference to FIG. 1.

Specifically, the portion of the analysis indicated by bracket 242 in FIG. 2 provides access to expert knowledge in storage matrix 121 (the exemption matrix) based on a relatively short series of fixed and invariant inquiries. The responses are used to directly address storage matrix 121 in accordance with fixed and invariant categories of information and without the use of inference. The storage matrix 121 is directly updated as information changes (e.g. with exemption information as exemptions are granted or limited) in a straightforward manner, similar to updating data in a simple database, which does not require modification of the inference engine. Storage matrix 122, used upon a determination being made, may also be updated in the same fashion and without modification of the inference engine.

Section 244 requires development of sequences of inquiries and determination rules (e.g. evaluation expressions) but implementation of a user interface, such as with menus, is straightforward from the analysis protocol which must be developed in any case. Updating takes the form of simply implemented text and pointer change in a menu or other selection medium which follow directly from changes in the analysis protocol. Further, selection from menus or other selection medium provides an effective user interface; the development of which is justified for ease and efficiency of use in instances in which determinations cannot be accomplished in section 242. The inferences embodied in pointers provided in response to selections made provides rapid traversal of the decision tree.

Section 246 provides for updating through simple choice of key words such as in text which it may be desirable to access through the expert system. Ordering and inference for the purpose of efficiently traversing a decision tree is much less important since section 244 is limited to exceptions which should be encountered relatively rarely. Thus the division between sections 244 and 246 need not be particularly distinct and the efficiency of traversal of the decision tree may be varied as may be found to be justified by the number of times particular exceptions are encountered. In other words, the order of steps in an analysis protocol becomes less important as larger amounts of information are input and made available for decision since a sequence of exceptions can be evaluated at high speed while making user inquiries only where required. At the same time, the preferred embodiment of the invention allows substantial importance to be placed on order of steps of the analysis protocol, allocating the highest importance of order to the more frequently encountered determinations in section 244. Conversely, no more complexity of the expert system need be included in the design thereof than is found to be justified while minimizing the difficulty of updating the expert system for any particular degree of expert system complexity and facility and actually facilitating updating of the more complex portions thereof.

In view of the foregoing, it is seen that the present invention provides for improved ease of application and design of expert systems for particularly large and complex bodies of expert information which may be from multiple sources. By the same token, the invention provides an architecture in which ease and efficiency of use of an expert system can be achieved while minimizing the complexity of updating of the expert system to levels justified by efficiency of user interaction and without truncation of the analysis protocol embodied therein. The capture of deterministic and non-deterministic analysis sequences and user intervention for each instance of analysis provides for further user convenience and consistency of user intervention as well as for correction of analysis results and expansion of the expert system with continued use.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An expert system including a database, an expert knowledge interface and an inference engine wherein said inference engine includes an inquiry sequence comprising a sequence of invariant inquiries, and at least one pointer to a location in said expert knowledge interface and a further pointer to a location in said database, said expert knowledge interface includes at least one data storage matrix which is accessible on the basis of responses to said inquiry sequence, and wherein said at least one pointer is accessed in response to return of data of a first type accessed from said data storage matrix and said further pointer is accessed in response to data of a second type of data from said location in said expert knowledge interface.

2. An expert system as recited in claim 1, wherein said expert knowledge interface further includes a further data storage matrix accessible in response to data of a second type accessed from said at least one data storage matrix.

3. An expert system as recited in claim 1, wherein said expert knowledge interface further includes means for transiently storing at least one item of user-selectable information derived from information in said database, said at least one item of user-selectable information being accessed from said inference engine in response to said at least one pointer.

4. An expert system as recited in claim 3, wherein said further pointer to a location in said database is accessed in response to evaluation of a selection from said user-selectable information and responses to said inquiry sequence.

5. An expert system as recited in claim 3 wherein said item of user-selectable information is contained in a menu.

6. An expert system as recited in claim 1, further including means for capturing at least one of said inquiry sequence and said item of user-selectable information and corresponding user input data for at least selected operations of said expert system.

* * * * *